Feb. 26, 1957 R. F. CONKLING ET AL 2,783,351
SPLIT INDUCTION HEATING COIL
Filed April 12, 1954 4 Sheets-Sheet 1

INVENTORS
ROY F. CONKLING
BY WILLIAM H. MYERS

Whittemore, Hulbert & Belknap
ATTORNEYS

Feb. 26, 1957    R. F. CONKLING ET AL    2,783,351
SPLIT INDUCTION HEATING COIL

Filed April 12, 1954    4 Sheets-Sheet 2

INVENTORS
ROY F. CONKLING
WILLIAM H. MYERS
BY Whittemore, Hulbert & Belknap
ATTORNEYS

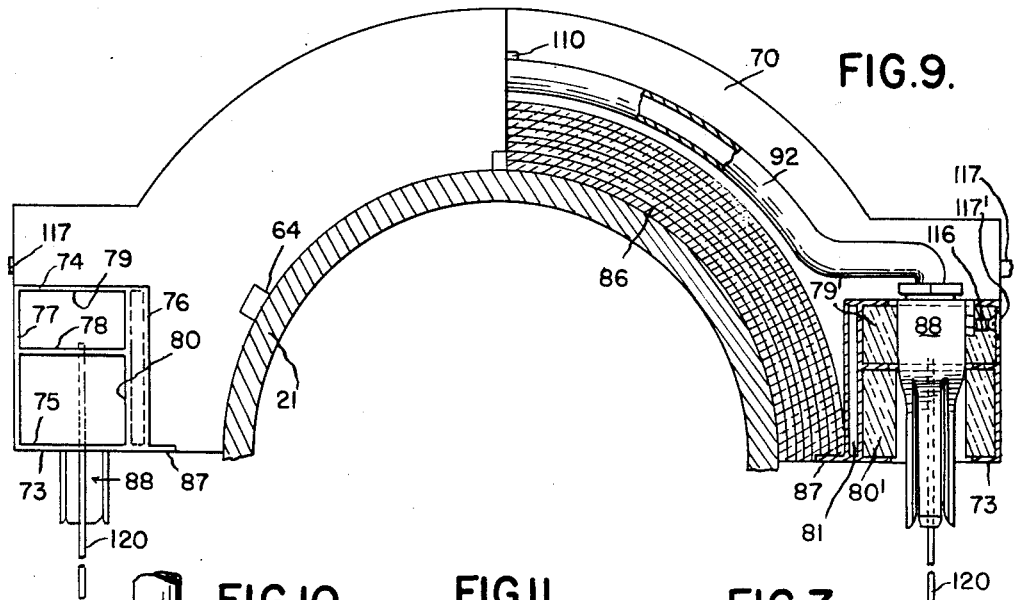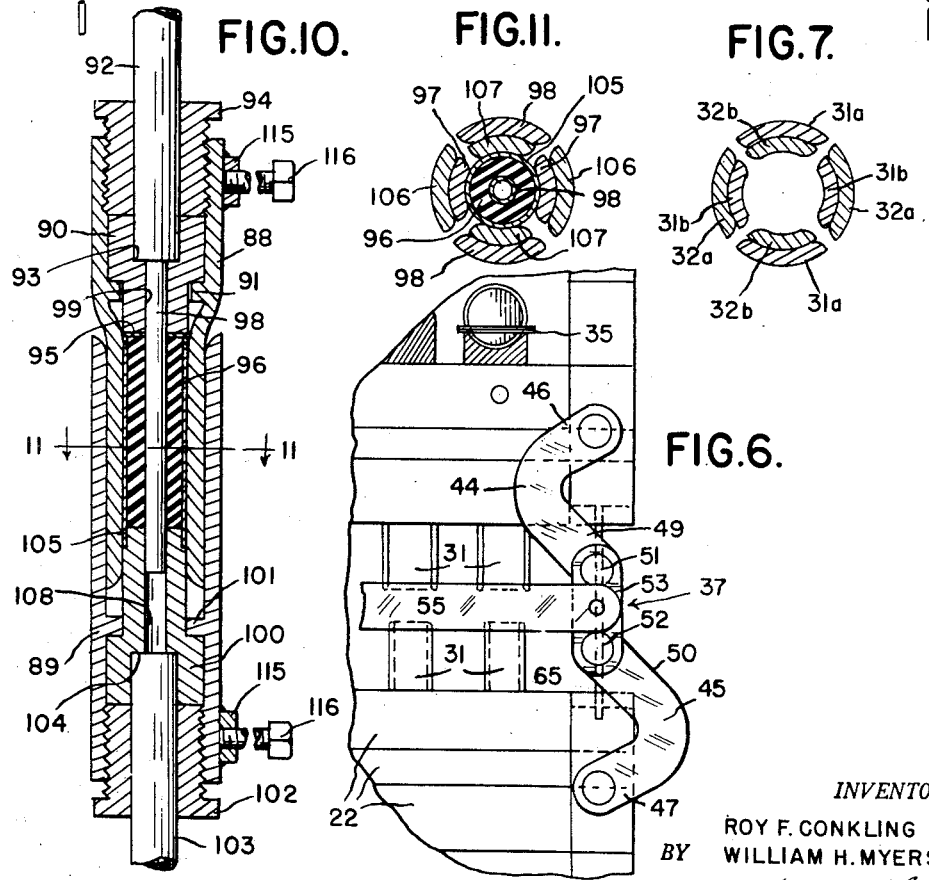

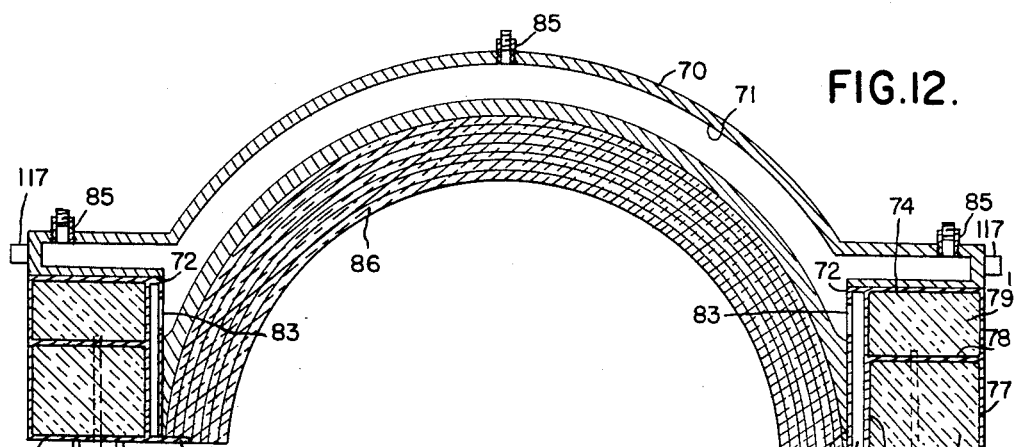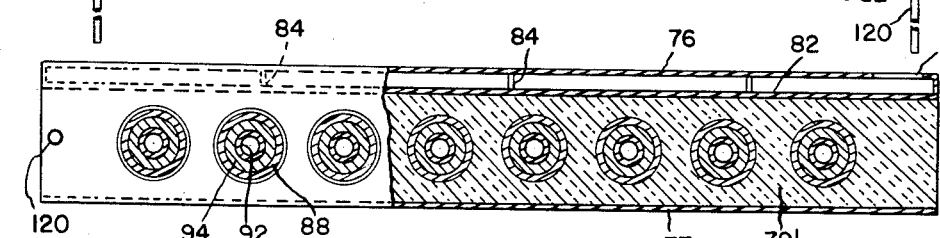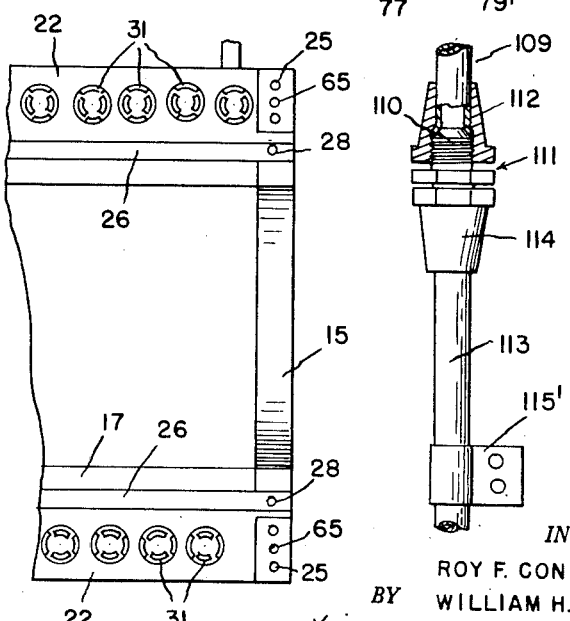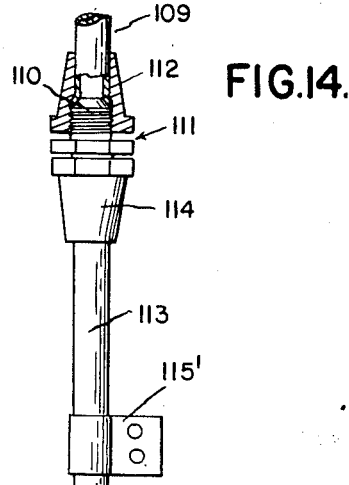
INVENTORS
ROY F. CONKLING
WILLIAM H. MYERS
BY Whittemore, Hulbert & Belknap
ATTORNEYS United States Patent Office 2,783,351
Patented Feb. 26, 1957

2,783,351

SPLIT INDUCTION HEATING COIL

Roy F. Conkling, Port Huron, and William H. Myers, Algonac, Mich.

Application April 12, 1954, Serial No. 422,392

18 Claims. (Cl. 219—10.79)

This invention relates to an induction heating coil for use particularly in the welding together of metal parts such as pipes.

In certain welding operations such as butt welding the ends of two pipes together, stresses are apt to be set up due to the heat from the welding arc and such stresses, unless relieved, can be a dangerous factor, particularly where the pipes are to be used under conditions of high pressure, such, for example, as where such pipes are employed as conduits for high pressure steam.

In order to relieve the stresses, both before and after the weld has been made, various types of heaters have been employed. The induction method of heat treating pipes has also been tried and found to provide extremely satisfactory results. In accordance with one method of stress relieving a pipe or pipes either before or after welding, an insulation is provided by winding asbestos paper or other insulating material around the pipe and an induction coil is provided by winding a conductor spirally over the insulation and about the pipe, and an alternating current is applied to the coil to heat the pipe by induction. However, the time consumed in building the insulation and coil upon the pipe and removing the same is considerable, and moreover, the life of the insulation and the conductor is reduced since it must be wound and unwound for each stress relieving operation.

One object of this invention is to provide an induction coil which may be quickly applied to and removed from the pipes to be welded together. In this connection, the coil is constructed of two half sections which may be applied to opposite sides of a pipe and clamped together in a minimum amount of time.

Another object of the invention is to provide a heat insulation which is an integral part of the coil.

Still another object of the invention is to provide an induction coil of minimum weight. In this connection, the coil is constructed of the lightest weight material possible, consistent with the duties required thereof.

Another object of the invention is to provide an induction coil which is formed of arcuate partial sections, each section having a plurality of circumferentially extending conductor elements. The conductors of one section respectively contact the conductors of another section upon assembly of the sections to provide a continuous coil. Accordingly, the coil and insulation are not required to be wound and unwound about a pipe to be heat treated and the life of the coil and insulation is thereby greatly increased.

Another object of the invention is to provide an induction coil having provision for the circulation of a coolant therethrough, thus, preventing overheating of the coil. In this connection, the coil itself may be of tubular construction having coolant inlet and outlet connections, and the coil-supporting frame may also be of a construction permitting the circulation of a suitable coolant through it.

A further object of the invention is to provide means for quickly and easily clamping together and unclamping the sections of the split coil.

Still another object of the invention is to provide connectors or clamps for the coil sections which may be loosened or partially released to permit the coil to be moved along the pipe being heated and secured in its new location by closing the coil. During the actual butt welding operation, it is oftentimes desirable to shift the heating coil away from the joint being welded to give the workman more room.

Other objects of the invention will become apparent as the description proceeds, especially when taken in conjunction with the accompanying drawings, wherein:

Figure 6 is a fragmentary view similar to Figure 2 showing the means for connecting the half sections of the coil together in partly open or released position;

Figure 7 is a cross-sectional view showing the contacts of two conductor elements respectively carried by the coil sections, in engaging relation;

Figure 8 is a fragmentary bottom plan view on a reduced scale of one coil section;

Figure 9 is an end elevational view, partly in section, of one coil section having a modified construction;

Figure 10 is an enlarged sectional view showing the contacts of two conductor elements respectively carried by coil sections constructed as in Figure 9, the contacts being shown in engaging relation;

Figure 11 is a cross-sectional view taken along the line 11—11 on Figure 10;

Figure 12 is a sectional view of the structure shown in Figure 9;

Figure 13 is an elevational view partly in section of a portion of the structure shown in Figure 12; and Figure 14 is a detail view showing the connection of the tubular coil to a coolant supply pipe.

Figures 1, 2:
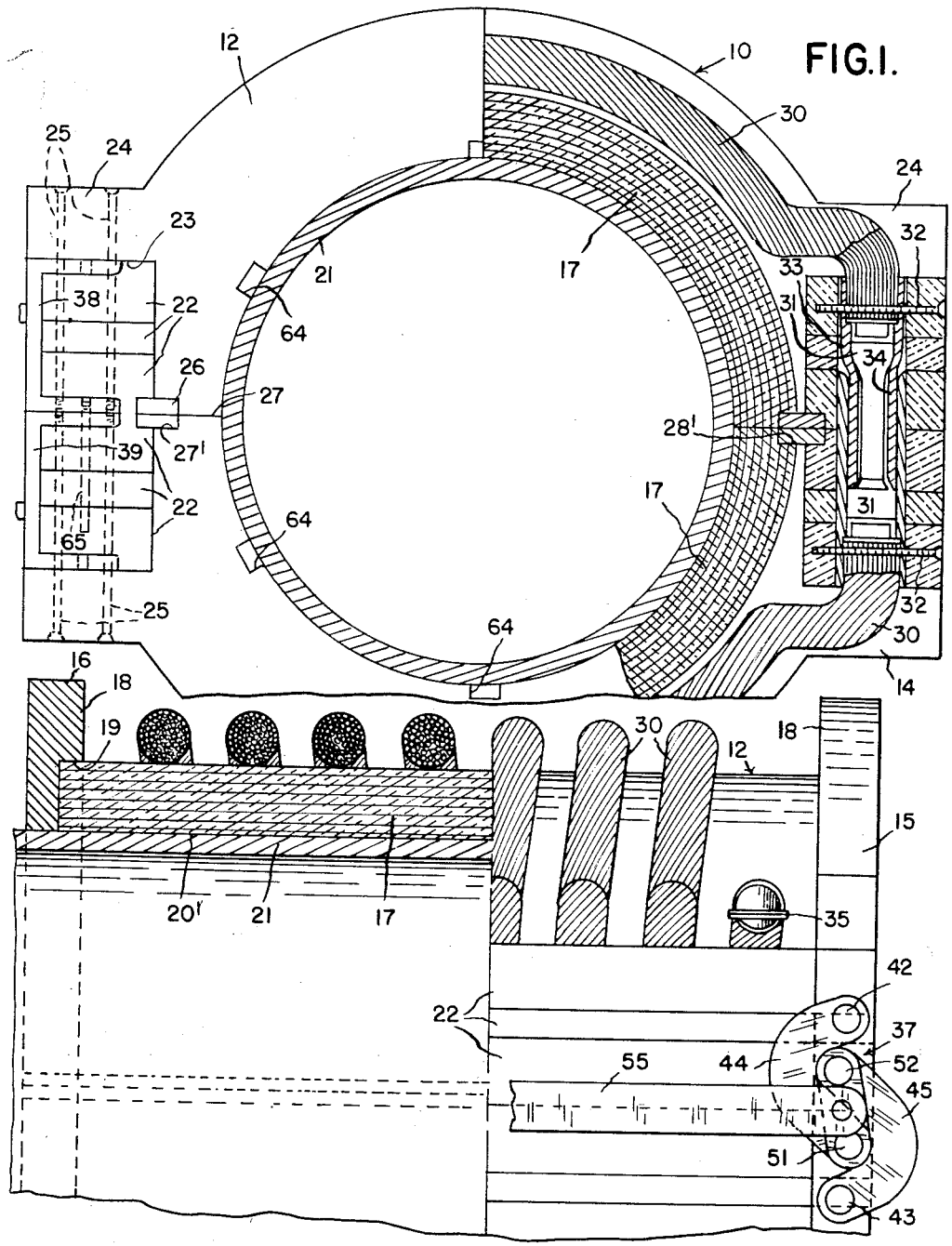
Figure 1 is an end elevational view, partly in section, of a split induction coil constructed in accordance with the present invention.
Figure 2 is a side elevational view, partially in section, of the coil shown in Figure 1.

Referring now more particularly to the drawings and especially to Figures 1-8, a split induction heating coil is seen which is designated by the numeral 10. The induction coil is made up of two arcuate half sections 12 and 14 which may be releasably secured together around a pipe to complete the coil for a heat treating operation.

Each half section comprises a frame or supporting structure which is comprised of the axially spaced generally semi-cylindrical end members 15 and 16. Extending between the end members 15 and 16 of each half frame section of the coil is a sheet of suitable prefabricated pipe insulating material 17 which is also of semi-cylindrical configuration and which may be formed of laminated asbestos paper, if desired. The axially inner faces 18 of the end members are formed with arcuate grooves or recesses 19, these recesses extending to the radially inner arcuate surfaces 20 of the end members, and the opposite ends of the insulating sheet 17 are received in these recesses. It will thus be apparent that the inner surface 20' of the insulating sheet 17 extends flush with the arcuate surfaces 20 of the end members so that the insulating sheet may snugly embrace a pipe 21 about which the coil is applied.

The end members of each coil section are rigidly secured together by the axially extending bars 22 of a suitable heat and electrically insulating material such as Transite. The bars 22 are arranged in two groups for each half frame section, one group extending along each of the two opposite sides of the frame section. The opposite sides of each end member is recessed as indicated at 23 defining the laterally extending lugs 24, and the elongated mounting screws 25 are provided for securely attaching the opposite ends of the bars 22 to the respective lugs 24.

In order to retain the insulating sheet 17 in position and in assembled relationship with the end members, retaining strips 26 are provided which extend between the end members and are secured to the radially extending terminal surfaces 27 by bolts 28. It will be apparent that the insulating sheet 17 may be easily removed and replaced from its associated coil section by merely removing the retainers 26. It will be noted that the end members are recessed at 27' and the insulation 17 is also recessed as at 28' to accommodate strips 26.

The half sections 12 and 14 described above comprise the supporting frame for the electrical coil and also provide heat insulation for the pipe 21. It is clear that the frame sections are identical except in the arrangement for the electrical contacts for the induction coil, as will appear more fully hereinafter.

The electrical conductor generally indicated at 29 extends spirally along the length of the frame to provide the induction coil. In detail, the coil comprises a plurality of axially spaced circumferentially extending conductors or cables 30 carried by each frame section. These cables are disposed about the radially outer side of the insulating sheet 17. Each conductor 30 is separate and independent of the other conductors and has at each of its ends a contact 31. These contacts 31 are arranged and constructed in a manner such that the contacts of the conductors of one frame section engage the respective contacts of the conductors of the other frame section when the sections are secured together to complete the induction coil, as shown in Figure 1.

The contacts 31 are fixedly secured in the axially extending bars 22 by means of screws 32. The bars 22 are, of course, provided with suitable apertures 33, the apertures for each contact being aligned with each other to provide an open through passage so that the ends of the contacts may project beyond the bars and toward the other frame section, and also so that the opposite ends of the conductors 30 may be inserted thereinto and secured to the respective contacts by means of the securing screws 32.

The contacts 31 are all of the same construction and are formed of a suitable electrically conducting material. The contacts are suitably bored to receive the ends of the conductors, as seen in Figure 1, and have integral outwardly extending spring fingers 34. Each contact has a total of four spring fingers, one diametrically opposite pair of fingers being spaced slightly radially inwardly of the other diametrically opposite pair.

Referring to Figure 7, one contact has the diametrically opposite fingers 31a spaced radially outwardly farther than the other fingers 31b. The other contact is the same, having the radially outer fingers 32a and radially inner fingers 32b.

As seen in Figure 8, the contacts along one side of the frame are disposed in the same rotative position, and the contacts along the other side of the frame are likewise all disposed in the same rotative position but turned 90° from the contacts on the first side. It will be appreciated that the contacts on the other frame section will be arranged exactly opposite to those illustrated in Figure 8 in order that the two frame sections may fit together with the contacts in engaging relation as shown in Figures 1 and 7. By arranging the contacts along one side of a frame section in a rotative position turned 90° from the contacts along the other side, it is impossible to assemble the two frame sections together backwards.

When the sections 12 and 14 are secured together as shown in Figure 1, the conductor elements provide a continuous spiral coil and the opposite ends of the coil are provided with suitable terminals 35 for attachment to a source of electrical supply. The conductors 36 to which the terminals 35 are connected, are, of course, provided with contacts 31 similar to those already described.

In order to clamp the two frame sections of the split coil together, releasable clamping devices 37 are provided. One such device is provided at each of the four corners of the coil. Referring particularly to Figures 2, 4, 5 and 6, each clamping device 37 comprises a pair of brackets 38 and 39, the bracket 38 being mounted in suitable recesses formed in the bars 22 adjacent to an end member 15 of one frame section, and is fixedly secured to the end member by both of the mounting screws 25 which pass through the apertures 40 formed in the legs of bracket 38. The bracket 39 is likewise provided with legs having apertures 41 for receiving both of the mounting screws 25 of the other section of the coil, the bracket 39 being similarly mounted on the other section. Outwardly projecting lugs 42 and 43 are provided on the respective brackets, and these lugs are adapted to releasably pivotally support the generally V-shaped links 44 and 45. The link 44 faces in an axially outer direction relative to the split coil, and the link 45 faces in the opposite direction. The ends of the remote legs 46 and 47 are pivotally mounted on the lugs 42 and 43. The links are releasably retained on the respective lugs by the spring pressed balls 48. As will be seen, the links extend towards each other and the ends of the adjacent legs 49 and 50 are provided with lugs 51 and 52 respectively pivotally connected to the opposite ends of the link 53. Spring pressed balls 54 are also provided on the lugs 51 and 52 to provide releasable connections.

As will be seen from a comparison of Figures 6 and 2 of the drawings, when the links 44 and 45 are moved from the open position of Figure 6 to the closed position of Figure 2, the lugs 51 and 52 cross over to the other side of a straight line drawn through the pivots provided by the lugs 42 and 43. It will be apparent that any tendency for the frame sections of the split coil to open up or to radially move away from each other will be prevented when the links are in this position. In order to release the links from the position shown in Figure 2, it is necessary to turn the link 53 in a clockwise direction and this is accomplished by means of an elongated handle 55.

While the herein described means for locking the two halves of the coil together are preferred, it will of course be understood that other means may be provided.

When in partially open position of the links, with the frame sections of the coil about ¼" apart, the coil may be moved axially along the pipe and subsequently clamped in a new position. It is not necessary to separate the sections sufficiently to disengage the contacts 31 for this purpose. This is extremely convenient when it is desired to give the welder more room during the process of welding. After the welding has been accomplished, the split coil may again be shifted back to a position adjacent to the weld for further heat treating.

In the fully open position of the links, shown in Figure 6, the frame sections are separated with the contacts of the respective sections out of engagement. In this position, the split coil is ready to be removed from the work, one half section at a time, by removing the straps from lugs 51 and 52, whereupon the sections may be completely separated.

The handle 55 is provided with a member 56 formed with a socket of hexagonal or other suitable non-circular cross section. Link 53 is provided with a similarly shaped non-circular lug 57 receivable in said socket for turning link 53 by the handle. Spring-pressed ball 57' provides a releasable connection between handle 55 and lug 57.

In order to avoid the necessity of turning the handle through a great arc in order to accomplish clamping and unclamping of the links 44 and 45, a one-way clutch mechanism is provided between the handle 55 and the socket member 56. Any suitable one-way clutch mechanism may be employed, and by way of illustration, the handle 55 may have a circular grooved opening for rotatably receiving the socket member 56, and the socket member is circular and has an annular rib received in the groove which is provided with angularly arranged recesses 61 having a ball 62 in each recess. The recesses 61 are shaped with cam surfaces 63 for causing the balls to wedge therein when the handle is turned counterclockwise with respect to the socket member. The recesses are also formed to permit free rotation of the handle relative to the socket member in the other direction. Accordingly, it is only necessary to oscillate the handle 55 through a small arc. Only one of the clamping devices 37 has been described and it will be understood that the other devices are similarly constructed.

Figure 3:
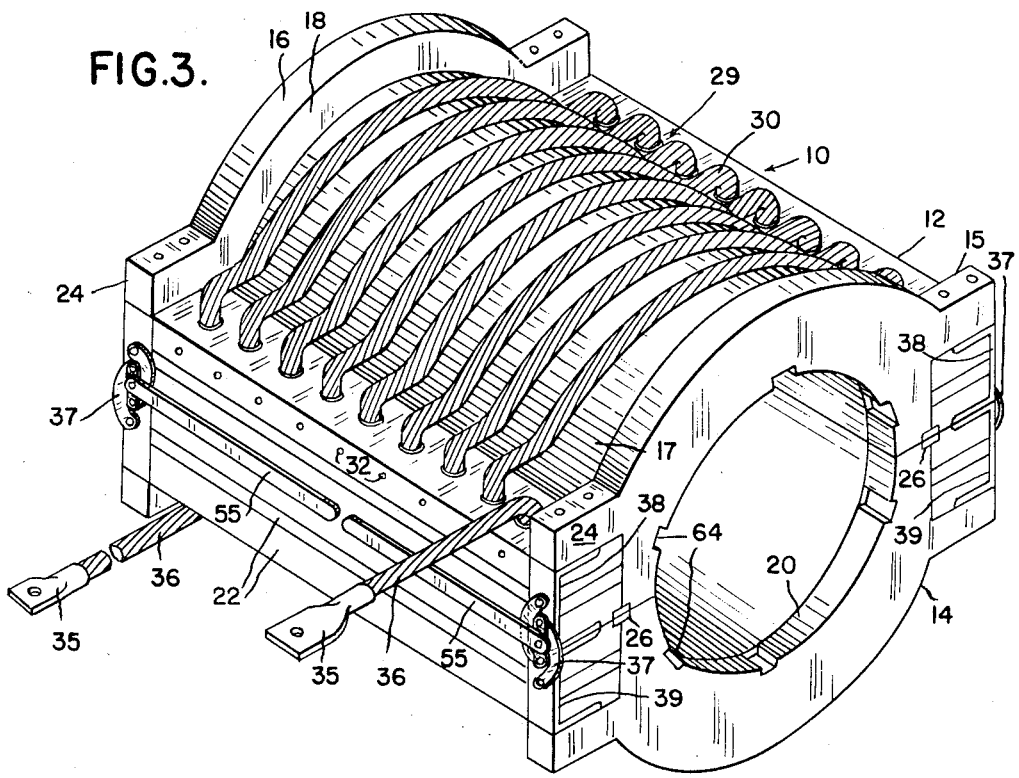
Figure 3 is a perspective view of the coil.
Figure 4:
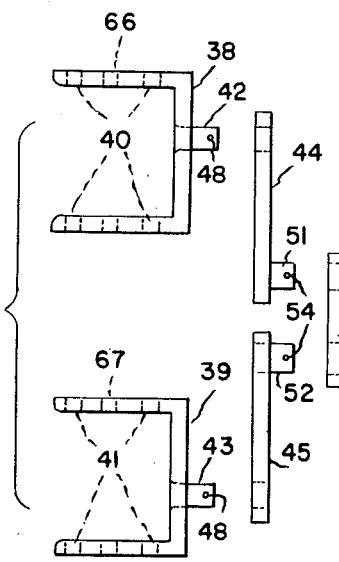
Figure 4 is an exploded view of the means for connecting the two half sections of the coil together.
Figure 5:
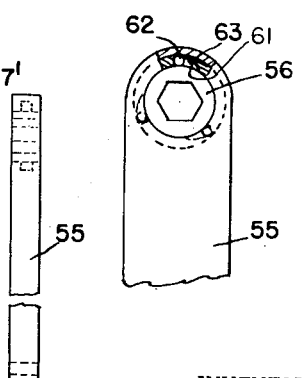
Figure 5 is an enlarged fragmentary view of a portion of the structure shown in Figure 4.

It will be noted from Figure 3 that the inner ends of handles 55 extending from clamping devices at opposite ends of the coil, terminate closely adjacent to each other. In this way, both handles on one side may be operated by one hand, and likewise, both handles on the other side may be operated by one hand. Only a small oscillatory movement of the handles is required, as noted.

It will be appreciated that to clamp and unclamp the devices, the handles must be removed and reversed so that the one-way clutch mechanism will operate in the right direction. It will be appreciated that in place of the one-way clutch mechanism disclosed, other means may be provided for accomplishing the same result. Thus, for example, a reversible ratchet mechanism might be employed.

The devices 37 will be made of light weight non-magnetic material, such as aluminum, as will handles 55.

The radially inner surfaces of the end members may desirably be recessed to provide angularly spaced notches 64 for receiving thermocouples to determine the temperature of the pipe.

Guide pins 65 are provided to maintain the frame sections aligned. Four pins are provided on the frame section 12, located at the corners thereof and extending toward the other frame section. The pins are threadedly secured in openings 66 of the respective brackets 38 and extend into suitable openings in the bars 22, through openings 67 in brackets 39. These pins align the sections even in the open position of Figure 6.

Figures 9–13 show a modified form of construction. The induction coil illustrated in these figures is generally similar to that previously described and differs therefrom broadly in that the end members of each half frame section are of hollow construction and connected by passages for the circulation of a suitable coolant, and also in that the conductors which make up the coil are of tubular construction so that a coolant may also be circulated throughout the entire coil. Preferably the end members are of a relatively light non-magnetic material such as aluminum.

Referring to Figure 12, one end member 70 is there shown, it being understood that all four end members of the two frame sections are of identical construction. The end members 70 are hollow to provide a fluid passage 71 and ports 72 at either side. The spaced end members of each frame are interconnected by the assemblies 73. These assemblies each comprise a casing, of aluminum for example, having the top and bottom walls 74 and 75, the radially inner and radially outer walls 76 and 77, an intermediate partition 78 which is coextensive with the top and bottom walls and divides the casing into two compartments for receiving bars of insulating material. The compartment 79 may, for example, contain a bar of Transite 79′ and the compartment 80 may contain a bar of marinite 80′. These bars may be slid into place through the open ends of the casings and are suitably secured in place as by bolts not shown.

Along the radially inner side of each casing is a fluid passage 81 separated from the bars of insulating material by the partition 82. This fluid passage runs from one end of the casing to the other and the passage communicates with the ports 72 in the end members of each frame section by way of openings 83 in the radially inner side wall adjacent the opposite ends thereof. Spacers 84 may, if desired, be provided to reinforce the passages.

Suitable openings or ports 85 are provided in each of the end members for the inlet and outlet of a coolant. Thus, one or more of the ports 85 in one of the end members of each frame section may be connected to a source of water or other liquid coolant, and one or more of the ports 85 of the other end member of the same frame section may serve as an outlet or discharge port. It will be appreciated that the circulation of coolant through one frame section may be independent of the circulation of the coolant through the other frame section, or that a circulation system common to both frame sections may be employed.

The top and bottom walls of each casing 73, as well as the intermediate partition 78 and the bars of insulating material will be provided with a series of suitable aligned through passages for the contacts of each of the conductors. As seen in Figure 9, the openings in the top and bottom walls and intermediate partition of each casing is somewhat enlarged so as not to short circuit the adjacent conductors of the coil.

As in the embodiment first described, a sheet of suitable pipe insulating material 86 extends between the end members of each frame section and is supported in assembled relation therewith by lips 87 projecting radially inwardly from the inner side walls of the casings.

It will be understood that the panels or walls of the casings may be welded together, for example.

The contacts 88 and 89 are of slightly different construction from those previously described and these will now be considered in detail. The contacts 88 are carried by one frame section and the contacts 89 are carried by the other. Contacts 88 are of tubular construction and have received therein a metallic insert 90 provided with an annular shoulder for engagement with the annular shoulder 91 within contact 88 to accurately position the insert. The conductors making up the coil are of tubular stock, such as copper tubing, as mentioned above. As seen in Figure 10, a tubular conductor 92 extends into contact 88 and has its end portion soldered or brazed in the recess or socket 93 of the insert.

The insert is maintained in assembled relationship against shoulder 91 by a nut 94 threaded in the inner end of the contact.

An annular cup-shaped member 95 is soldered on the outer end of the insert and suitably secured in the cup-shaped member 95 is a length of hose or flexible tubing 96 of rubber or similar material. The contact 88 is similar to the contacts described in connection with the first embodiment in that it is provided with resilient outwardly extending fingers, four in number, one pair of diametrically opposed fingers 97 being spaced radially inwardly of the other diametrically opposed pair of fingers 98. These fingers will be seen to embrace the flexible tubing 96. A tube 98 is secured in a passage 99 of insert 90, the passage 99 opening into the socket 93.

The contacts 89 provided on the other half frame section are of slightly different construction. As shown in Figure 10, the insert 100 is similar to the insert 90 but of somewhat greater length and is held in position against the shoulder 101 by a nut 102 threaded into the inner end of contact 89. The end portion of a conductor 103 is suitably secured in a recess or socket 104 of insert 100, and the insert has an outwardly extending tubular extension 105 suitably secured to the insert in an annular recess along the outer end of the latter. The tubular extension 105 is adapted to embrace the flexible tubing 96 in the engaging position of the contacts, as shown in Figure 10. The tube 98 of contact 88 projects into the passage 108 of insert 100, the latter passage opening into the socket 104 which receives the tubular conductor. Radially outer legs 106 and radially inner legs 107 of contact 89 cooperate with the legs of the other contact as shown in Figure 10.

In the position of the contacts as shown in Figure 10, the outer end of the flexible hose 96 sealingly abuts against the end of insert 100, and a continuous fluid passage is completed through the contacts. The hose 96 is also constructed so that in the position of Figure 10 it is compressed lengthwise (approximately ¼"), causing it to expand inwardly against tube 98 and also to expand outwardly against tube 105, thus making a water-tight passage between the two halves of the spiral conductor, for the coolant.

It will be understood that although only one of the contacts 88 of one half frame section and one of the contacts 89 of the other half frame section have been illustrated, the other contacts are similarly constructed. It will be seen that provision has thus been made for the circulation of a suitable coolant through the continuous induction coil provided by the individual tubular conductors.

One end of a coolant inlet pipe is indicated at 109 (Fig. 14) and has a flared end abutting one end of the threaded extension 110 of tubular connector 111. Sleeve 112 threadedly engages the extension and has an internal shoulder which clamps the flared end of the pipe against the extension to provide a liquid tight joint. One end 113 of the tubular coil may be similarly flared and clamped liquid tight against the extension at the opposite end of connector 111 by sleeve 114, in a like manner. It will be understood that a similar connection may be provided between the other end of the coil and an outlet pipe. Obviously other means may be employed to attach the coil to a source of coolant.

Contacts such as 115' are soldered respectively to opposite ends of the coil to connect the latter to a source of electric current.

It will be noted that socket members 115 are provided on each contact 88 and 89. Bolts 116 extend through the bar of insulation in compartment 79 into these socket members to hold the latter fixedly in position. Openings 117' in the casing 73 are provided for access to bolts 116. It will also be observed that cylindrical lugs 117 are provided on opposite sides of each end member 70. These lugs are similar to those designated 42 and 43 in the first embodiment, and serve to pivotally mount the links 44 and 45 of the clamping devices 37, the latter being obviously equally useful in connection with the construction shown in Figures 9–13.

Guide pins 120 are like those described in connection with the embodiment of Figures 1–8. The pin is located at each end of each casing of one frame section, extending outwardly or toward the other frame section. The casing of the other section is formed with suitable openings to receive the pins and align the sections. These pins are secured in threaded openings in partitions 78 and are of course of a length to interconnect the sections in aligned position even when the clamping devices 37 are in fully open position, shown in Figure 6.

It is to be understood that tubular conductors may also be used in connection with frame sections as illustrated in Figures 1–8.

What we claim as our invention is:

1. Apparatus for preheating and stress relieving metallic joints before and after welding, comprising an annular heat insulating frame adapted to be positioned around the joint, said frame comprising arcuate sections of heat insulating material and means for releasably securing said sections together to complete the annular frame, and an induction heating coil extending spirally about said frame, said coil comprising a plurality of circumferentially extending electrical conductors carried by each frame section, each conductor having electrical contacts at its opposite ends fixedly secured to the associated frame section whereby said conductors form a structural unit with said frame sections, and the contacts of the conductors of one section being arranged and constructed to engage the respeceive contacts of the conductors of the other section when said sections are secured together to complete the induction heating coil.

2. Apparatus as defined in claim 1 in which said frame is cylindrical and said frame sections are semi-cylindrical, each frame section comprises spaced arcuate end members having opposed arcuate grooves in their adjacent sides, a sheet of heat insulating material extending between the end members of each section and having its opposite end portions received in said grooves, and axially extending members interconnecting the end members of each section.

3. Apparatus as defined in claim 2 in which the conductors of said induction coil extend around the radially outer sides of the sheets of heat insulating material.

4. Apparatus as defined in claim 3 in which said sheets of heat insulating material are formed of laminated asbestos paper.

5. Apparatus for preheating and stress relieving metallic joints before and after welding, comprising an annular cylindrical heat insulating frame to be positioned around the joint, said frame comprising a pair of separable semi-cylindrical half sections of heat insulating material and means for releasably securing said half sections together to complete the cylindrical frame, an induction heating coil extending spirally around said frame, said coil comprising a plurality of circumferentially extending conductors carried by each frame section, each conductor having electrical contacts at its opposite ends fixedly secured to the associated frame section whereby said conductors form a structural unit with said frame sections, the contacts of the conductors of one section being arranged and constructed to engage the respective contacts of the conductors of the other section when said sections are secured together to complete the induction heating coil, said frame sections being of hollow construction to provide for the circulation of a coolant therethrough, and coolant inlet and outlet ports for said frame sections.

6. Apparatus as defined in claim 5, in which each frame section comprises spaced arcuate hollow end members, an arcuate sheet of heat insulating material extending between the end members of each section and supported thereby, and axially extending members, connecting the end members of each section, said axially extending members having passages therein and having ports at their opposite ends respectively communicating with the hollow interior of said end members for permitting the circulation of coolant from one end member of each frame section to the other through the passages in said axially extending members.

7. Apparatus as defined in claim 6 in which said end members are of relatively light weight non-magnetic construction.

8. Apparatus for preheating and stress relieving metallic joints before and after welding, comprising an annular cylindrical frame adapted to be positioned around the joint, said frame comprising a pair of arcuate half sections and means for releasably securing said half sections together to complete the frame, and an induction heating coil extending spirally about said frame, said coil comprising a plurality of circumferentially extending tubular electrical conductors carried by each half section, each conductor having electrical contacts secured to its opposite ends fixedly secured to the associated frame section whereby said conductors form a structural unit with said frame sections, and the contacts of the conductors of one frame section being arranged and constructed to engage the contacts of the other frame section when said sections are secured together to complete the induction coil, a passage in each contact in open communication with the end of the tubular conductor to which it is secured, the passages in the contacts of each pair of engaging contacts being in open communication with each other to provide a continuous passage for coolant through the coil, and coolant inlet and outlet ports for said coil.

9. Apparatus as defined in claim 8 in which the contacts are provided with tubular portions defining said passages, and the tubular portions of each pair of engaging contacts telescoping one within the other.

10. Apparatus as defined in claim 9 in which the telescoping portions of each pair of engaging contacts comprises a radially inner telescoping portion in the form of a flexible hose of yieldable material and a radially outer telescoping portion having an internal shoulder for abutting the end of said hose to provide a liquid tight joint.

11. Apparatus as defined in claim 10 in which each flexible hose is reinforced by a relatively rigid tube sleeved therewithin, and in which said hoses are longitudinally compressed by engagement with said internal shoulders causing said hoses to expand radially inwardly and outwardly into engagement with said tubes and outer telescoping portions respectively.

12. Apparatus as defined in claim 11 in which each contact is formed with annularly arranged spring fingers, the fingers of each pair of engaging contacts telescoping with each other.

13. Apparatus for preheating and stress relieving metallic joints before and after welding, comprising an annular frame adapted to be positioned around the joint, said frame comprising a pair of arcuate half sections, means for releasably securing said half sections together to complete the frame, and an induction heating coil extending spirally about said frame, said coil comprising a plurality of circumferentially extending electrical conductors carried by each frame section, each conductor having electrical contacts at its opposite ends fixedly secured to the associated frame section whereby said conductors form a structural unit with said frame sections, the contacts of the conductors of one frame section being arranged and constructed to engage the respective contacts of the conductors of the other frame section when said frame sections are secured together to complete the induction heating coil, said securing means comprising a pair of devices respectively located at opposite ends of said frame, each device comprising first and second link V-shaped, a first pivot mounting a leg of the first link on one frame section and a second pivot mounting a leg of the second link on the other frame section, said links extending toward each other from their pivotal mountings and facing in opposite directions axially of said frame, a strap, third and fourth pivots respectively connecting the legs of said first and second links to the opposite ends of said strap, said strap being rotatable from a locking position wherein the said other leg of each link extends within the V of the other link to a released position wherein said links are spaced from each other, said third pivot being disposed to the side of a straight line through said first and second pivots corresponding to the direction in which said first link faces and said fourth pivot being disposed to the other side of said straight line in the locking position, thereby to resist any tendency of said frame sections to move apart, a handle extending from the strap of each device, and reversible ratchet means connecting said handles to the respective straps, said handles extending toward each other and terminating close together to permit an operator to oscillate both handles with one hand.

14. Apparatus as defined in claim 13, having guide pins on one of said frame sections extending toward the other frame section, and openings in said other frame section for slidably receiving said guide pins, whereby to properly align said sections during movement thereof toward and away from each other between the locking and released positions of said links.

15. Apparatus for preheating and stress relieving metallic joints before and after welding, comprising an annular frame adapted to be positioned around the joint, said frame comprising a pair of arcuate half sections, means for releasably securing said half sections together to complete the frame, and an induction heating coil extending spirally about said frame, said coil comprising a plurality of circumferentially extending electrical conductors carried by each frame section, each conductor having electrical contacts at its opposite ends fixedly secured to the associated frame section whereby said conductors form a structural unit with said frame sections, the contacts of the conductors of one frame section being arranged and constructed to engage the respective contacts of the conductors of the other frame section when said frame sections are secured together to complete the induction heating coil, said securing means comprising first and second links V-shaped, a first pivot mounting a leg of the first link on one frame section and a second pivot mounting a leg of the second link on the other frame section, said links extending toward each other from their pivotal mountings and facing in opposite directions axially of said frame, a strap, third and fourth pivots respectively connecting the other legs of said first and second links to the opposite ends of said strap, said strap being rotatable from a locking position wherein the said other leg of each link extends within the V of the other link to a released position wherein said links are spaced from each other, said third pivot being disposed to the side of a straight line through said first and second pivots corresponding to the direction in which said first link faces and said fourth pivot being disposed to the other side of said straight line in the locking position, thereby to resist any tendency of said frame sections to move apart.

16. Apparatus as defined in claim 15 in which said third and fourth pivots provide a releasable connection between said strap and said links.

17. Apparatus as defined in claim 16 in which a handle extends from said strap to manipulate the latter, and reversible ratchet means connecting said handle to said strap.

18. Apparatus as defined in claim 17 including a releasable connection between said handle and strap.

References Cited in the file of this patent

UNITED STATES PATENTS

| | | |
|---|---|---|
| 1,386,575 | Lewis | Aug. 2, 1921 |
| 2,178,931 | Crites et al. | Nov. 7, 1939 |
| 2,180,513 | Fugill et al. | Nov. 21, 1939 |
| 2,343,889 | Denneen et al. | Mar. 14, 1944 |
| 2,452,168 | Warren | Oct. 26, 1948 |
| 2,634,311 | Darling | Apr. 7, 1953 |
| 2,649,529 | Smith et al. | Aug. 18, 1953 |
| 2,656,562 | Phillips | Oct. 27, 1953 |